March 28, 1961 P. E. WIBLE, JR 2,977,537

FREQUENCY METER

Filed Oct. 6, 1955

Paul E. Wible, Jr
INVENTOR

BY Wm. T. Wofford
ATTORNEY 2,977,537

FREQUENCY METER

Paul E. Wible, Jr., Fort Wayne, Ind., assignor to Varo Mfg. Co., Inc.

Filed Oct. 6, 1955, Ser. No. 538,941

2 Claims. (Cl. 324—81)

My invention relates generally to devices for measuring the frequency of electric wave energy, and more particularly to a novel device for indicating frequency over a limited range with a high degree of precision.

Another object of my invention is to provide a novel frequency indicator which combines simplicity and precision.

Another object of my invention is to provide a novel precision frequency indicator utilizing parts which tend to be inherently trouble-free, with resulting improved reliability.

Figure 1:
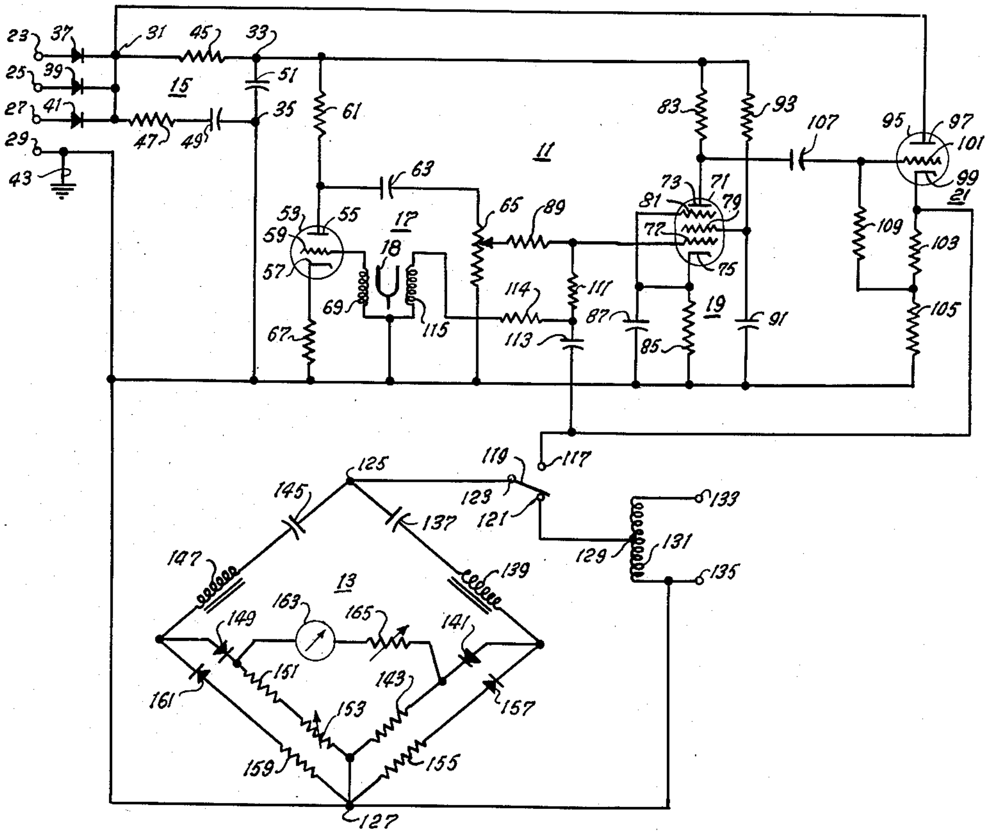
Figure 2:
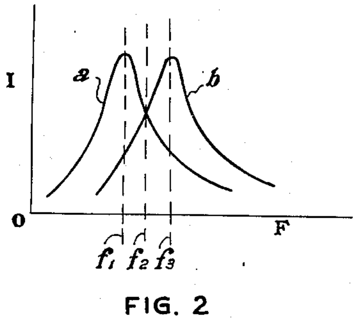

These and other objects are effected by my invention as will be apparent from the following description taken in accordance with the accompanying drawings, forming a part of this application, in which:

Figure 1 is a schematic circuit diagram showing a preferred embodiment of the invention, and Figure 2 is a graph illustrating certain aspects of the invention.

The device shown by the schematic circuit diagram of Fig. 1 may be considered as being made up of two major sections, namely, the calibrator section, indicated generally at 11, and the meter, or indicator section, indicated generally at 13. The calibrator section comprises a power supply 15, and an oscillator section. The oscillator section includes a first amplifier stage 17, a tuning fork resonator, 18, and a feedback amplifier stage. The feedback amplifier stage includes a pentode amplifier 19, and a cathode follower stage 21. The power supply input terminals 23, 25, 27, 29 are adapted for connection to a three phase, 4 wire power source (not shown). The power supply has first, second, and third output terminals 31, 33, 35. There is a rectifier element 37, 39, 41 connected between each of three of the power supply input terminals and the first power supply output terminal 31. The fourth power supply input terminal 29 is grounded at 43, as is the third power supply output terminal 35. The rectifiers 37, 39, 41 are poled to conduct in the direction from the respective power supply input terminal 23, 25, 27 to the first power supply output terminal 31. A filter resistor 45 is connected between the first and second power supply output terminals 31, 33. A surge limiting resistor 47 is connected in series with a filter capacitor 49 between the first power supply output terminal 31 and ground 43. Another filter capacitor 51 is connected between the second power supply output terminal 33 and ground 43.

The first amplifier stage 17 of the calibrator section 11 comprises a triode 53 having an anode 55, a cathode 57 and a grid 59. The anode 55 of the oscillator triode 53 is connected to a plate load resistor 61, to the second power supply output terminal 33, and through a coupling capacitor 63 to one fixed terminal of a level control potentiometer 65 which has its other fixed terminal connected to ground 43. The grid 59 of the triode 53 is connected to one terminal of the tuning fork resonator driven coil 69, the other terminal of which is connected to ground 43. The cathode 57 of the amplifier triode 53 is connected through a cathode resistor 67 to ground 43.

The voltage amplifier stage of the feedback amplifier comprises a pentode 71 having an anode 73, a cathode 75, and control, screen and suppressor grids 77, 79, 81. The anode 73 of the pentode 71 is connected through a plate load resistor 83 to the second power supply output terminal 33. A cathode resistor 85 is connected in parallel with a bypass capacitor 87 between the pentode cathode 75 and ground. The pentode suppressor grid 81 is connected to the pentode cathode 75. A mixing resistor 89 is connected between the movable tap of the level control potentiometer 65 and the pentode control grid 77. The pentode screen grid 79 is connected through a bypass capacitor 91 to ground 43, and through a dropping resistor 93 to the second power supply output terminal 33.

The cathode follower stage 21 of the feedback amplifier comprises a triode 95 having an anode 97, a cathode 99, and a grid 101. The cathode follower anode 97 is connected to the first power supply output terminal 31. First and second cathode resistors 103, 105 are serially connected between the cathode follower cathode 99 and ground 43. A coupling capacitor 107 is connected between the anode 73 of the pentode 71 and the cathode follower grid 101. A grid return resistor 109 is connected between the junction of the first and second cathode resistors 103, 105 last mentioned, and the cathode follower grid 101. A mixing resistor 111 is connected in series with a feedback capacitor 113 between the pentode control grid 77 and the cathode follower cathode 99. The tuning fork drive coil 115 is connected in series with a feedback resistor 114 between the junction of the mixing resistor 111 and capacitor 113 last mentioned and ground 43. The tuning fork coils are arranged such that a positive going voltage at the grid 59 of triode 53 causes the tuning fork element to move so as to make the grid 59 even more positive. The cathode follower cathode 99 is connected to the first input terminal 117 of a two position single pole selector switch 119 having a second input terminal 121 and an output terminal 123.

The meter, or indicator section 13 comprises a bridge circuit having upper and lower input terminals 125, 127. The upper terminal 125 of the bridge is connected to the output terminal 123 of the selector switch 119. The second input terminal 121 of the selector switch 119 is connected to the secondary tap 129 of an auto-transformer 131, having primary terminals 133, 135 adapted for connection to a source the frequency which is to be measured or indicated. The lower bridge input terminal 127 is connected to one primary terminal 135 of the auto-transformer 131 and to ground 43. There is a first current path from the upper bridge input terminal 125 through a serially connected first capacitor 137, first inductance 139, first rectifier element 141, and first resistor 143, to the lower bridge input terminal 127. There is a second current path from the upper bridge input terminal 125 through a serially connected second capacitor 145, second inductance 147, second rectifier element 149 and second resistor 151, and a variable zero-adjust resistor 153 to the lower bridge input terminal 127. There is a third current path from the lower bridge input terminal 127 through a serially connected third resistor 155, third rectifier element 157, said first inductance 139, and said first capacitor 137 to the upper bridge input terminal 125. There is a fourth current path from the lower bridge input terminal 127 through a serially connected fourth resistor 159, fourth rectifier element 161, said second inductance 147, and said second capacitor 145 to the upper bridge input terminal 125. The said first and second rectifier elements 141, 149 are poled to conduct in the direction toward the lower bridge input terminal 127, while said third and fourth rectifier elements 157, 161 are poled to conduct in the direction toward the upper bridge input terminal 125. The actual frequency indicator instrument 163, which is a suitable direct current average calibrated voltage sensitive device, is connected in series with a variable sensitivity-adjust resistor 165 between the junction of said first rectifier element 141 and first resistor 143, and the junction of said second rectifier element 149 and second resistor 151.

In operation, the calibrator section 11 serves to generate a stable signal of known frequency for calibration purposes. Let it be assumed that the indicator instrument 163 is to have a center frequency of 400 cycles per second with a range of several cycles above and below the center frequency. Then the calibrator would be set to have a 400 c.p.s. output frequency. When energized, the tuning fork oscillator will then generate a signal of 400 c.p.s. The output of the amplifier 17 is coupled via a coupling capacitor 63 to the feedback amplifier input. The level of the signal input to the feedback amplifier is controlled by means of the level-control potentiometer 65. The feedback amplifier output is taken to the first, or upper input terminal 117 of the selector switch. The calibrator section stability is enhanced by the use of feed-back loops. Feedback for the feedback amplifier is obtained by a connection from the cathode follower cathode 99 through the feedback capacitor 113 to the mixing network comprising resistors 89, 111. The calibrator circuit shown has been found in practice to be very stable.

Turning now to the indicator section, it will be noted that the upper arms of the bridge circuit each include a serially connected inductance and capacitor. The values of the inductances and capacitors are carefully chosen so that one arm will be resonant at a frequency below the center frequency, and the other arm will be resonant at a frequency above the center frequency; so that the resonance curves will have some substantially linear portions; and so the resonance current curves will intersect at a point where the curve portions immediately above the intersection will be substantially linear. Idealized resonance curves are shown by the graph of Fig. 2, wherein the ordinate represents current I and the abscissa represents frequency F. The left hand curve may be the resonance curve for the upper left bridge arm, and the right hand curve *b* may be the resonance curve for the upper right bridge arm. The upper left arm components 145, 147 are selected to be resonant at lower frequency $F_1$ while the upper right arm components 137, 139 are selected to be resonant at higher frequency $F_3$. The curves intersect at intermediate frequency $F_2$. The portions of the curves immediately above the intersection are substantially linear over a small range of frequencies on either side of the point of intersection. An alternating current signal applied to the bridge input terminals 125, 127 will be on one half-cycle pass from the upper terminal 125 through both upper arms and through the inner portions of both lower arms to the lower bridge input terminal 127, and on the other half cycle from the lower bridge input terminal 127 through the outside portions of both lower arms and through both upper bridge arms to the upper input terminal 125. The indicator instrument 163 measures the net difference in the direct average voltages across the resistors 151, 153 and resistor 143 of the inner portions of the lower bridge arms, respectively. At the intermediate frequency, $F_2$, where the resonance curves intersect, this net direct current average difference will be zero, and the indicator instrument will show a null. As the frequency of the input signal varies up or down, the net voltage will no longer be zero, but will have magnitude and direction, which will cause the instrument pointer to move through an appropriate angle to the right or left of null. The indicator instrument is calibrated to read the actual input frequency. The indicator sensitivity is adjusted by means of the variable resistor 165 which is connected in series with the indicator instrument.

It is desirable to calibrate the indicator section 13 before each use when extreme accuracy is an important factor since circuit component values and characteristics may vary somewhat with changes in temperature, humidity, vibration, age, etc. To calibrate, the selector switch 119 is closed to its upper input terminal 117 and a signal of the intermediate, or null frequency is fed from the calibrator section 11 to the bridge 13. The zero-adjust resistor 153 is then adjusted so the indicator instrument reads the null frequency. Adjustment of resistor 153 causes the indicator reading to vary, since it forces the direct current component of current to flow around the loop composed of resistors 151, 153, and 159 and rectifier diodes 149 and 161. This current flows because there can be no direct current flow through capacitor 145. Then if the sum of the resistors 151, 153 does not equal the value of resistor 159 then the direct current voltage developed on each alternate half cycle across these resistors is not equal and a direct current potential exists inside the loop. This direct current potential causes a current to flow around the loop whose magnitude is a function of the amount of unbalance of the resistance in the upper and lower arms. This current develops an IR drop across resistors 151 and 153 which thus allows this potential to be nulled against that across resistor 143 by adjustment of resistor 153. This means that the current flow through the upper left arm of the bridge is the same as that through the upper right arm, and also the voltage drop across resistors 151, 153 of the lower left arm is equal to the voltage drop across resistor 143 of the lower right arm. Now the selector switch 119 is closed to its slower input terminal 121 so that signals of unknown frequency are fed from the auto-transformer input terminals 133, 135 to the bridge input terminals 125, 127. If the frequency of the unknown signal is the same as that of the calibrator section output, then the currents in the upper bridge arms are still equal, the voltage drop across the lower left bridge arm resistors 151, 153 still equals the drop across the lower right arm resistor 143, and the indicator instrument 163 indicates a null at the same place as before. If the frequency of the unknown signals is above the null frequency, more current will flow through the upper right bridge arm than the upper left; there will be more voltage drop across the lower right arm resistor 143 than across the lower left arm resistors 151, 153, resulting in a current flow from right to left through the indicator instrument 163 causing its pointer to move to the right and read the actual value of the input frequency. If the unknown frequency is below the null frequency, a resultant current will flow from left to right through the indicator instrument 163, causing its pointer to move to the left to read the actual value of the input frequency. Thus, when the device has been properly calibrated, the indicator instrument 163 will then read the exact frequency of input signals within its range. Also, it is not necessary that the indicator instrument 163 be set to its null at the output frequency of the calibrator 11, since it will always indicate to the same deflection for the same frequency. This feature allows the instrument to be calibrated so that the indicator 163 shows some deflection from its null or zero at the output frequency of the calibrator 11. In operation this has the advantage of serving to indicate whether the calibrator has an output.

In actual practice, the improved device of my invention has demonstrated superior ability for indicating frequency over a limited range with a high degree of precision and reliability.

While I have shown my invention in only one form, it will be obvious to those skilled in the art that it is not so limited, but is susceptible of various changes and modifications without departing from the spirit thereof.

I claim:

1. A frequency measuring or indicating device comprising input terminals for connection to a source of signals the frequency of which is to be measured or indicated, a pair of independent current paths between said input terminals, each said path including serially connected inductance, capacitance, rectifier and resistance elements, said inductance and capacitance elements of one circuit path being chosen so as to resonate at a frequency below a predetermined frequency and said inductance and capacitance elements of the other circuit path being chosen so as to resonate at a frequency above said predetermined frequency with the resonance curves intersecting at said predetermined frequency, circuit branches each comprising serially connected rectifier and resistance elements and one such branch shunting the rectifier and resistance elements of each said path, the first mentioned rectifier elements being poled to conduct in the same direction with respect to said input terminals and the branch rectifier elements being poled to conduct in the opposite direction, and means including an indicator instrument connected between the junction of said rectifier and resistor elements in one said path and the junction of the rectifier and resistance elements of the other said path for sensing and utilizing the difference in current flow in said paths to indicate the frequency of the input signals.

2. A frequency measuring or indicating device comprising input terminals for connection to a source of signals the frequency of which is to be measured or indicated, a pair of independent circuit paths between said input terminals, each said path including serially connected inductance, capacitance, rectifier and resistance elements, said elements of one circuit path being chosen so as to produce resonance at a frequency below a predetermined frequency and said elements of the other circuit path being chosen so as to produce resonance at a frequency above said predetermined frequency, said elements of each path also being chosen so as to produce some substantially linear portions on their resonance characteristic curves with the resonance curves intersecting at said predetermined frequency and at a point where the portions of the curves immediately above the intersection are substantially linear, circuit branches each comprising serially connected rectifier and resistance elements, and one such branch shunting the rectifier and resistance elements of each said path, the first mentioned rectifier elements being poled to conduct in the same direction with respect to said input terminals and the branch rectifier elements being poled to conduct in the opposite direction, and means including an indicator instrument connected between the junction of said rectifier and resistance elements in one said path and the junction of the rectifier and resistance elements of the other said path for sensing and utilizing the difference in current flow in said paths to indicate the frequency of the input signals.

References Cited in the file of this patent

UNITED STATES PATENTS

| | | |
|---|---|---|
| 1,601,070 | Horton | Sept. 28, 1926 |
| 1,711,101 | Shanck | Apr. 30, 1929 |
| 2,478,023 | Summerhayes | Aug. 2, 1949 |
| 2,505,368 | Shenk | Apr. 25, 1950 |

FOREIGN PATENTS

| | | |
|---|---|---|
| 616,325 | Great Britain | Jan. 19, 1949 |
| 690,292 | Great Britain | Apr. 15, 1953 |
| 727,434 | Great Britain | Mar. 30, 1955 |